United States Patent
Mobrem et al.

(10) Patent No.: US 9,755,318 B2
(45) Date of Patent: Sep. 5, 2017

(54) MESH REFLECTOR WITH TRUSS STRUCTURE

(71) Applicants: Mehran Mobrem, Santa Barbara, CA (US); Geoffrey W. Marks, Santa Barbara, CA (US)

(72) Inventors: Mehran Mobrem, Santa Barbara, CA (US); Geoffrey W. Marks, Santa Barbara, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 224 days.

(21) Appl. No.: 14/151,514

(22) Filed: Jan. 9, 2014

(65) Prior Publication Data
US 2015/0194733 A1    Jul. 9, 2015

(51) Int. Cl.
| | |
|---|---|
| *H01Q 15/16* | (2006.01) |
| *G02B 5/10* | (2006.01) |
| *G02B 7/182* | (2006.01) |
| *H01Q 1/28* | (2006.01) |

(52) U.S. Cl.
CPC ............ *H01Q 15/168* (2013.01); *G02B 5/10* (2013.01); *G02B 7/182* (2013.01); *H01Q 15/161* (2013.01); *H01Q 1/288* (2013.01)

(58) Field of Classification Search
CPC .... H01Q 15/161; H01Q 15/168; H01Q 1/288; G02B 5/10; G02B 7/182
USPC .................................. 343/840, 912, 915, 916
See application file for complete search history.

(56) References Cited

U.S. PATENT DOCUMENTS

| | | | |
|---|---|---|---|
| 3,617,113 A | 11/1971 | Hoyer | |
| 5,680,145 A * | 10/1997 | Thomson | H01Q 15/161 343/840 |
| 5,864,324 A | 1/1999 | Acker et al. | |
| 5,990,851 A * | 11/1999 | Henderson | H01Q 1/081 343/840 |
| 6,219,009 B1 * | 4/2001 | Shipley | H01Q 1/288 343/912 |
| 6,225,965 B1 | 5/2001 | Gilger et al. | |
| 6,278,416 B1 * | 8/2001 | Harless | H01Q 1/288 343/840 |

(Continued)

FOREIGN PATENT DOCUMENTS

| | | |
|---|---|---|
| EP | 0 838 877 A2 | 4/1998 |
| EP | 1 387 438 B1 | 5/2006 |
| WO | WO 03/003517 A1 | 1/2003 |

OTHER PUBLICATIONS

Thomson MW: "The AstroMesh deployable reflector", Antennas and Propagation Society, 1999. IEEE International Symposium 1999, IEEE International Symposium 1999, Orlando, FL, USA, vol. 3, Jul. 11, 1999 (Jul 11, 1999), pp. 1516-1519, XP010347938, 001: 10.1109/APS.1999.838231 ISBN: 978-0-7803-5639-9 *the whole document*.

(Continued)

*Primary Examiner* — Lam T Mai
(74) *Attorney, Agent, or Firm* — Tarolli, Sundheim, Covell & Tummino LLP

(57) ABSTRACT

A reflector assembly includes a frame centered about a longitudinal axis and having a first height along the axis. A curved body extends from the frame and has a second height along the longitudinal axis could be greater than the first height. A stretchable membrane has an electromagnetically reflective surface and is secured to the curved body.

25 Claims, 12 Drawing Sheets

(56) References Cited

U.S. PATENT DOCUMENTS

| | | | |
|---|---|---|---|
| 6,836,255 B1 * | 12/2004 | Davis | H01Q 1/288 343/781 P |
| 6,930,654 B2 | 8/2005 | Schmid et al. | |
| 7,009,578 B2 * | 3/2006 | Nolan | H01Q 1/08 343/915 |
| 7,216,995 B2 | 5/2007 | Harada et al. | |
| 7,382,332 B2 * | 6/2008 | Essig, Jr. | F21S 11/00 343/915 |
| 7,595,769 B2 | 9/2009 | Bassily | |
| 2009/0057492 A1 | 3/2009 | Harris | |
| 2015/0244081 A1 * | 8/2015 | Mobrem | H01Q 15/168 343/915 |

OTHER PUBLICATIONS

International Search Report for corresponding PCT/US2014/065728 dated Jan. 23, 2015.

* cited by examiner

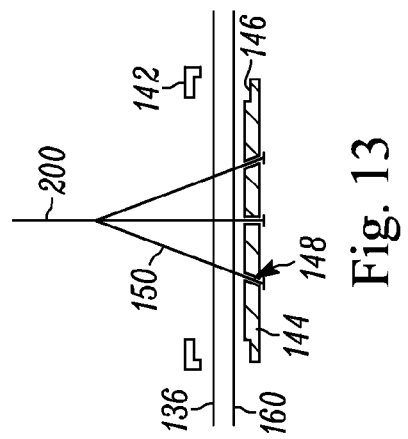
Fig. 13
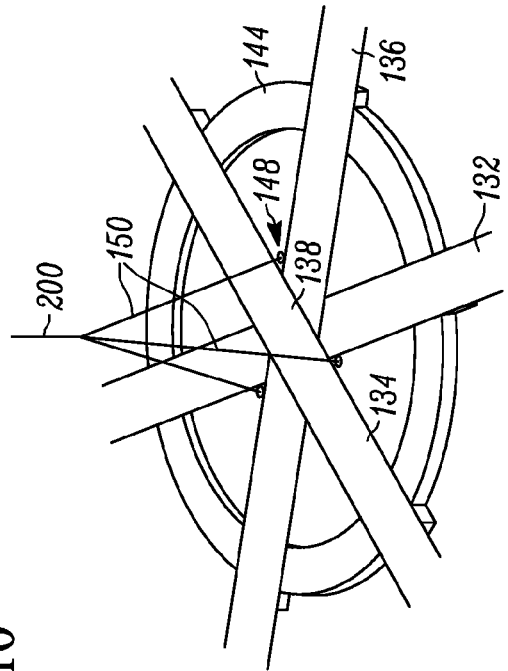
Fig. 12
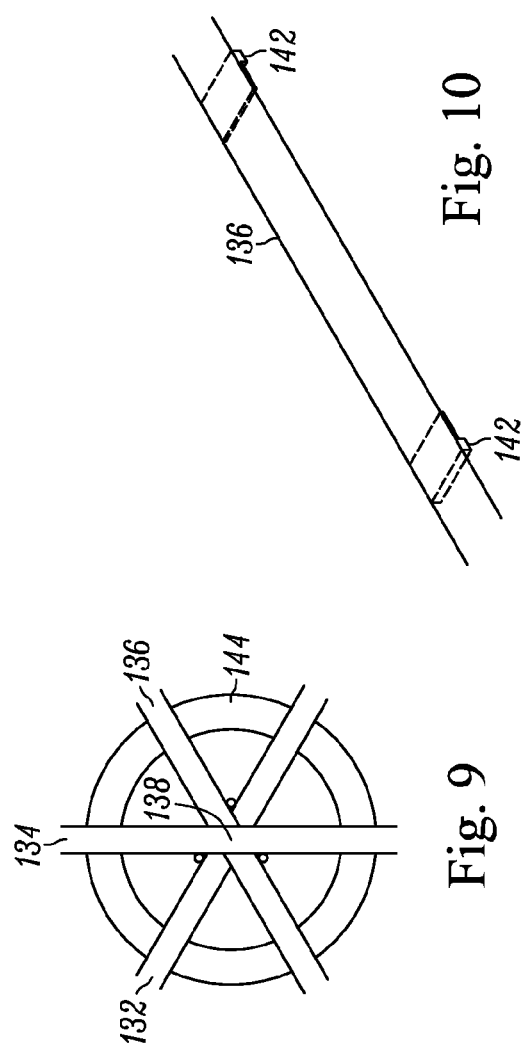
Fig. 10
Fig. 9
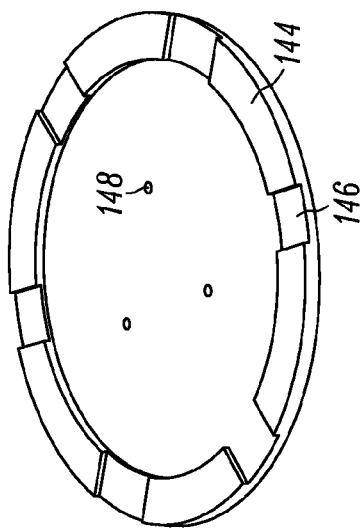
Fig. 11

US 9,755,318 B2

MESH REFLECTOR WITH TRUSS STRUCTURE

TECHNICAL FIELD

The present invention relates generally to reflector assemblies, and specifically to electromagnetic reflectors antennas for use in space and on spacecraft.

BACKGROUND

Reflectors for concentrating radiofrequency (RF) radiation are employed in a variety of antennas installed in spacecraft or mounted on the ground. Reflectors for concentrating solar radiation are employed as solar energy collectors in systems for converting solar energy into electrical energy.

Satellite and communications technologies often require that space-based devices and other high technology machinery be lightweight yet durable to withstand the effects of the space environment. Such devices, however, must also be practically devised to be launched from earth in a small package and deployed in space autonomously.

SUMMARY

One embodiment includes a reflector assembly that includes a frame centered about a longitudinal axis and having a first height along the axis. A curved body extends from the frame and has a second height along the longitudinal axis could be greater than the first height. A reflective mesh has an electromagnetically reflective surface and is secured to the curved body.

Another embodiment of the invention includes a reflector assembly having a frame that extends about a longitudinal axis and a curved body that extends from the frame. A reflective mesh has an electromagnetically reflective surface and is secured to the curved body. A hub is secured to the curved body and includes at least a portion having a position along the axis spaced from the frame for shaping the curved body. A plurality of struts extends between the hub and the frame for maintaining the position of the hub relative to the frame.

Another embodiment of the invention includes a reflector assembly having a frame centered about a longitudinal axis and having a first height along the axis. The frame includes a plurality of longerons pivotable relative to one another and a plurality of struts pivotable relative to one another such that the frame is moveable between a deployed condition and a collapsed condition. A curved first body extends from the frame and has a second height along the longitudinal axis greater than the first height. The first body includes a plurality of inextensible support members that define a mesh surface. A flexible, reflective mesh has an electromagnetically reflective surface and is secured to the mesh surface of the first body. A curved second body is connected to the first body by a plurality of tensioning members for maintaining the shape of the curved first body. A support structure is secured to the first and second bodies and the frame for shaping the curved first and second bodies.

BRIEF DESCRIPTION OF THE DRAWINGS

FIGS. 9-13 illustrate portions of the first body of FIG. 7.

DETAILED DESCRIPTION

The present invention relates generally to reflector assemblies, and specifically to electromagnetic reflector antennas for use in space and on spacecraft. The reflector assembly includes a large-aperture, lightweight reflector antenna that can be compactly stowed during transportation and delivery and thereby prepared for eventual deployment in space. The reflector assembly includes a frame, first and second net bodies connected to the frame, and a series of tensioning members extending between and connected to the bodies. A support structure attaches to both bodies and the frame to place and maintain the bodies in curved or parabolic shapes. A reflective mesh is secured to the curved first body for receiving and reflecting electromagnetic signals. The first body extends through and away from the frame such that the first body could have a greater depth or height than the depth of the frame.

Since the tensioning members and support structure maintain the reflective mesh in a taught, curved shape the reflector assembly is ideal for use in antennas due to its ability to precisely receive and reflect RF signals. The frame may be collapsible to form a deployable reflector assembly with articulatable struts or the frame may be fixed to provide an extremely lightweight reflector assembly. The larger depth of the first body relative to the frame allows the stowed frame to be smaller than conventional reflector assemblies in which the reflective structure has the same or smaller depth as the frame to which it is attached.

The first body is curved or parabolic and operates to support a reflector element for an antenna. The second body is also curved and provides structural support for the first net body, but does not shape a radiation pattern of the antenna. The first and second bodies have a stacked configuration such that the first and second bodies are both generally located on the same side of the frame. The reflector assembly could be implemented with a center feed and/or a non-center feed, e.g., to form an off-set reflector.

Figure 1:
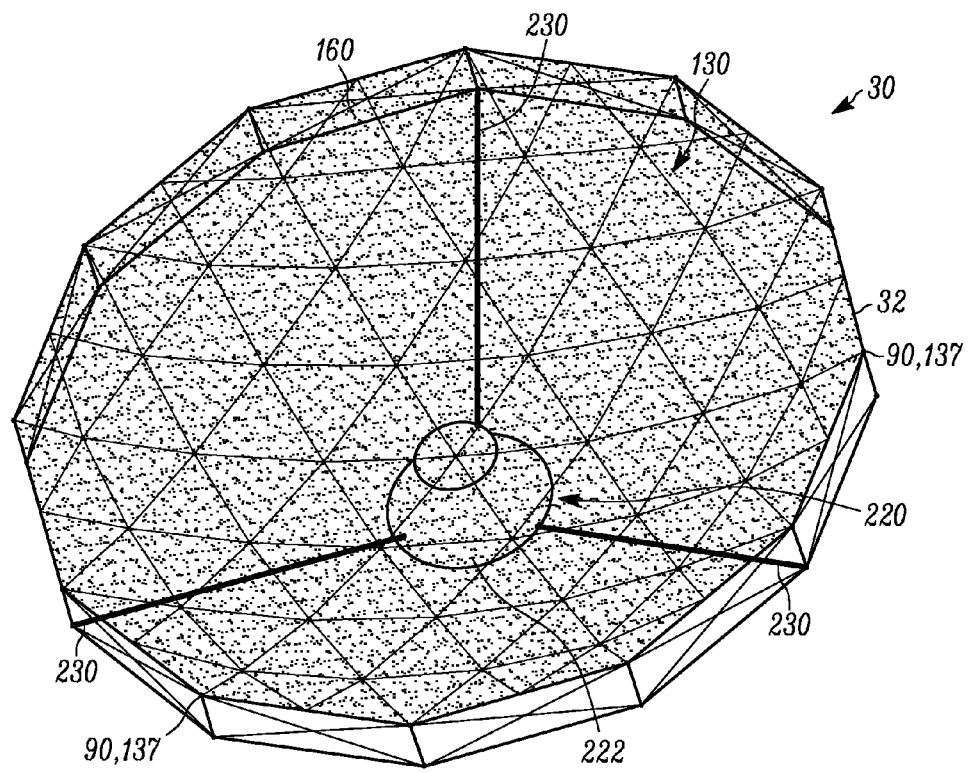
FIG. 1 is a schematic illustration of an example of the reflector assembly.
Figure 2:
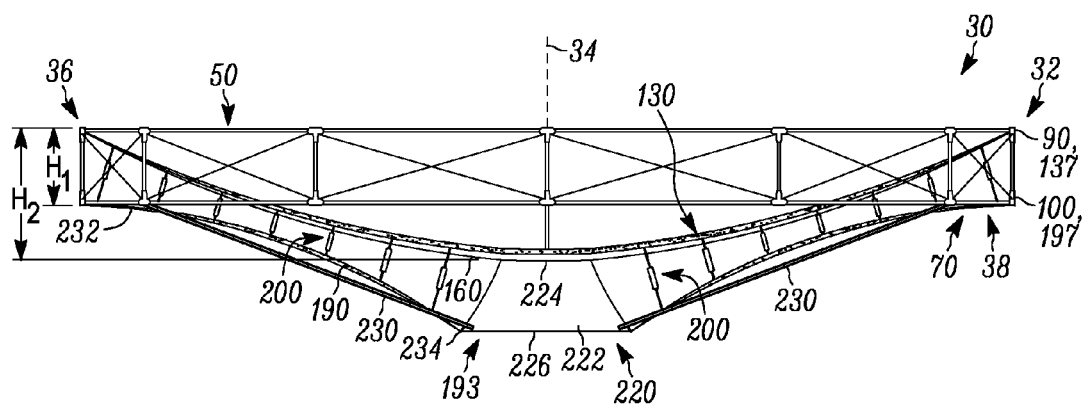
FIG. 2 is a side view of the reflector assembly of FIG. 1.
Figure 3:
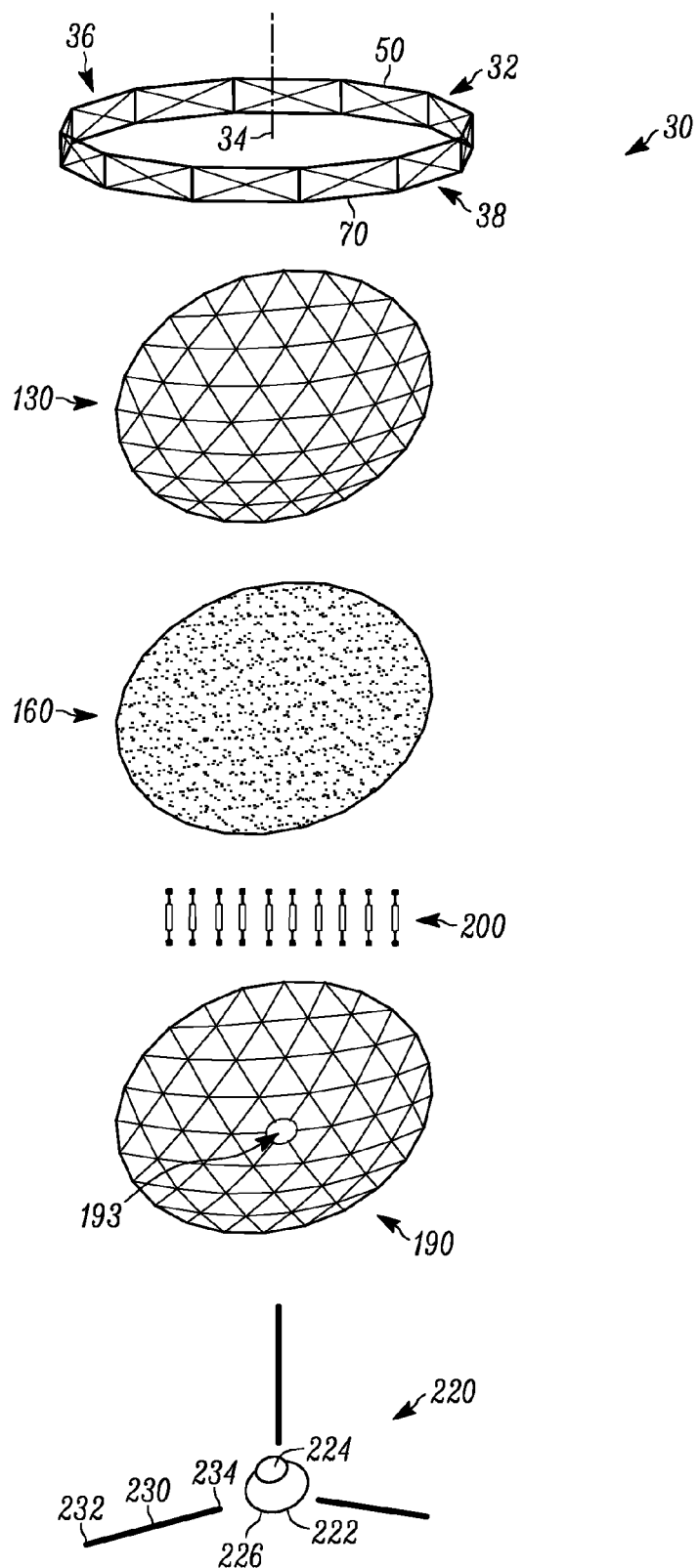
FIG. 3 is an exploded assembly view of the reflector assembly of FIG. 1.

FIGS. 1-3 illustrate an example of a reflector antenna assembly 30 suitable for use in space and on spacecraft. The reflector assembly 30 includes a truss or frame 32, a curved first body 130 that supports an electromagnetically reflective mesh 160, a curved second body 190 that supports and maintains the curved shape of the first body, tensioning members 200 connecting the first and second bodies together to form a rigid structure, and a support structure 220 for shaping the first and second bodies and maintaining the curved shapes relative to the frame.

Figure 4:
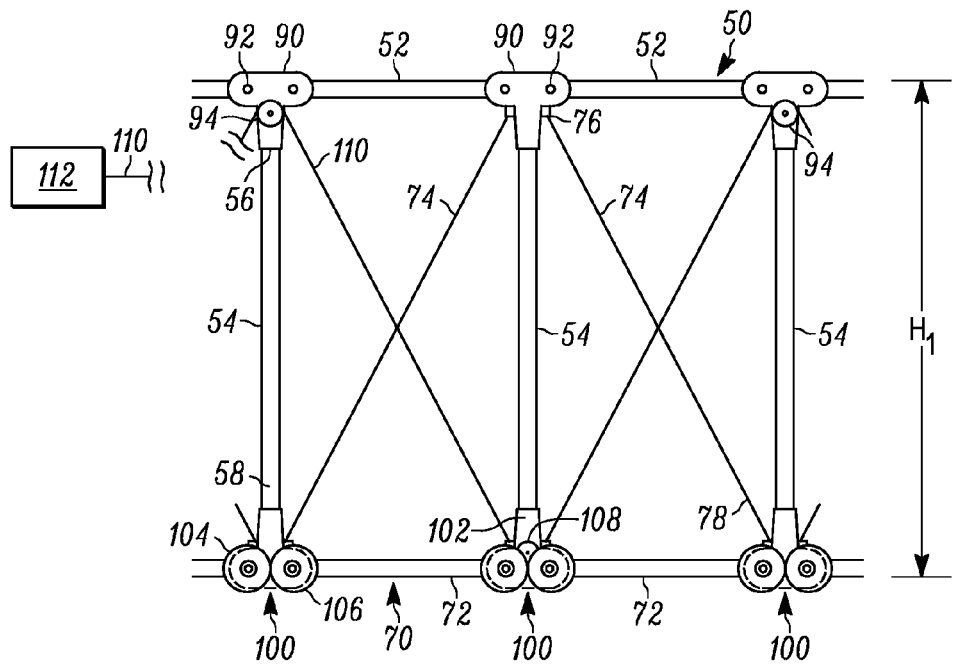
FIG. 4 is a partial view of the frame of FIG. 3 in a deployed condition.

Referring to FIGS. 3-4, the frame 32 has an annular shape and is centered about a longitudinal axis 34. The frame 32 extends along the axis 34 from a front side 36 to a rear side 38, although these spatial designations are interchangeable depending on the spatial orientation of the reflector assembly 30 during use. The frame 32 has a rigid, yet lightweight construction capable of withstanding expected environmental effects and conditions in space. The frame 32 includes annular first and second rims 50, 70 spaced along the axis 34 and interconnected by a plurality of struts 54, 74. The first rim 50 includes a plurality of interconnected longerons 52 and the second rim 70 includes a plurality of interconnected longerons 72. The first rim is 50 secured to the second rim 70 by a plurality of vertical struts 54 extending substantially parallel to the axis 34 and a plurality of diagonal struts 74 extending at an angle relative to the axis. More specifically, each vertical strut 54 includes an end 56 secured to the first rim 50 and an end 58 secured to the second rim 70.

Each diagonal strut 74 likewise includes an end 76 secured to the first rim 50 and an end 78 secured to the second rim 70. As illustrated, a diagonal strut 74 extends generally between each consecutive pair of vertical struts 54, although alternative configurations for the vertical and diagonal struts are contemplated. Collectively, the rims 50, 70 and struts 54, 74 cooperate to define a peripheral wall of the frame having a depth or height $H_1$ along the axis 34. The materials used for the first and second rims 50, 70 and vertical struts 54 are strong, stiff, substantially inextensible, and lightweight, e.g., a uniaxial fiber composite tubing. Each diagonal strut 74 may be a telescoping member constructed to have good tensile strength or may constitute a flexible, inextensible member.

The longerons 52, 72 constitute rigid members hinged end-to-end to one another to permit collapse and expansion of the reflector assembly 30 for stowing and deployment purposes. A series of connecting members 90 connect pairs of adjacent longerons 52 and a vertical strut 54 to one another around the first rim 50. Each connecting member 90 carries two pivot pins 92 by which two adjacent longerons 52 may pivot relative to one another and relative to the corresponding vertical strut 54. A freely rotatable pulley 94 is secured to every other connecting member 90 around the first rim 50.

Similarly, a series of connecting members 100 connect pairs of adjacent longerons 72 and a vertical strut 54 to one another around the second rim 70. Each connecting member 100 includes a support piece 102 on which two gears 104 and 106 are rotatably mounted. Each gear 104, 106 is fixed to an end of a respective longeron 72 so that rotation of either gear 104 or 106 results in pivotal movement of the longeron connected thereto. The gears 104, 106 on each connecting member 100 mesh with one another and therefore rotate in unison. Since the longerons 72 are secured to the gears 104, 106 and not the support piece 102 rotation of the gears pivots the longerons 72 relative to the vertical strut 74 associated therewith and relative to one another. The gears 104, 106 and pins 92 are configured such that the longerons 52 on the first rim 50 pivot in unison with the longerons 72 on the second rim 70 during expansion/collapsing of the frame 32.

Every other connecting member 100 further includes a pulley 108 rotatably mounted on the support piece 102 and positioned between the gears 104, 106. The connecting members 90, 100 are configured such that the pulleys 94 along the first rim 50 alternate with the pulleys 108 on the second rim 70 in a zig-zag manner around the perimeter of the frame 32. Each diagonal strut 74 extends between and is rigidly secured to a connecting member 90 that does not carry a pulley 94 and a connecting member 102 that does not carry a pulley 108.

Figure 5:
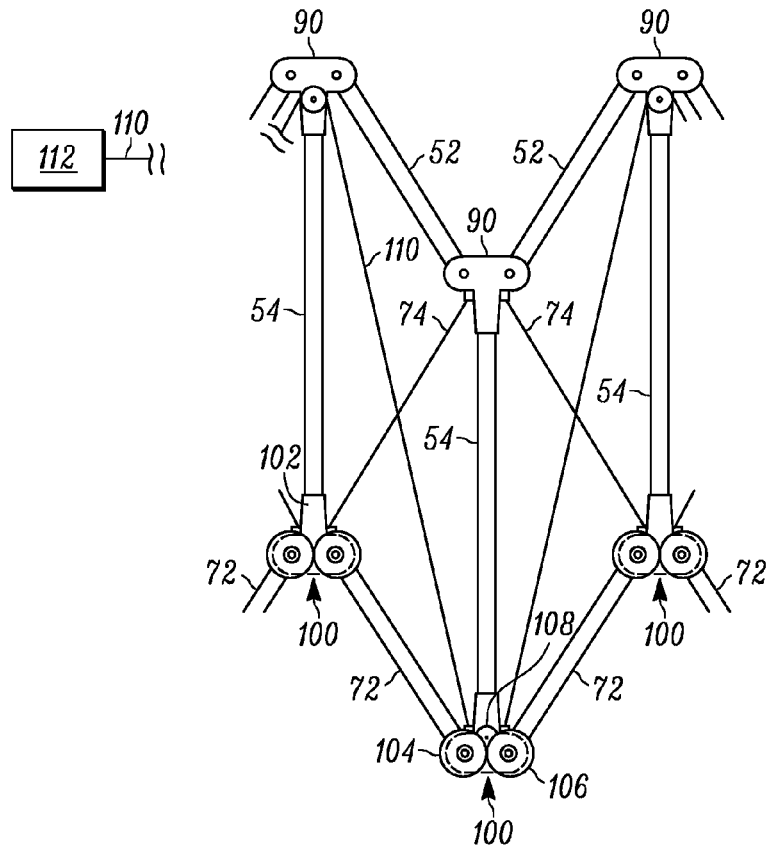
FIG. 5 is a partial view of the frame of FIG. 3 in a partially collapsed condition.

A deployment cable 110 is looped in an alternating manner around the pulleys 94 and 108 and thereby follows the zig-zag path around the perimeter of the frame 32. One end of the cable 110 is fixed to the frame 32 and the other end of the cable is secured to a mechanism, such as a motor 112, for tensioning the cable to deploy the frame. Due to this construction and the pivoting capability of the longerons 52, 72, the frame 32 is operable between a deployed condition (FIG. 4) and a collapsed or stowed condition (partially collapsed as shown in FIG. 5). In the deployed condition, the longerons 52 on the first rim 50 extend substantially perpendicular to the vertical struts 54 and the axis 34 to form a rigid, annular first rim. Likewise, the longerons 72 on the second rim 70 extend substantially perpendicular to the vertical struts 54 and the axis 34 to form a rigid, annular second rim. The longerons 52 therefore extend substantially parallel to the longerons 72 when the frame 32 is deployed.

Pivoting of the longerons 52 about the pins 92 and rotation of the longerons 72 with the gears 104, 106 allows the longerons 52, 72 to move radially closer to one another relative to the axis 34 (FIG. 5). This causes the connecting members 90 to move radially inward and closer to one another, thereby decreasing the diameter of the first rim 50. The connecting members 100 likewise move radially inward and closer to one another, thereby decreasing the diameter of the second rim 70. Consequently, the frame 32 collapses to a smaller, more compact size in which the longerons 52, 72 generally extend in the same vertical direction, which facilitates stowing and manipulation.

Figure 6:
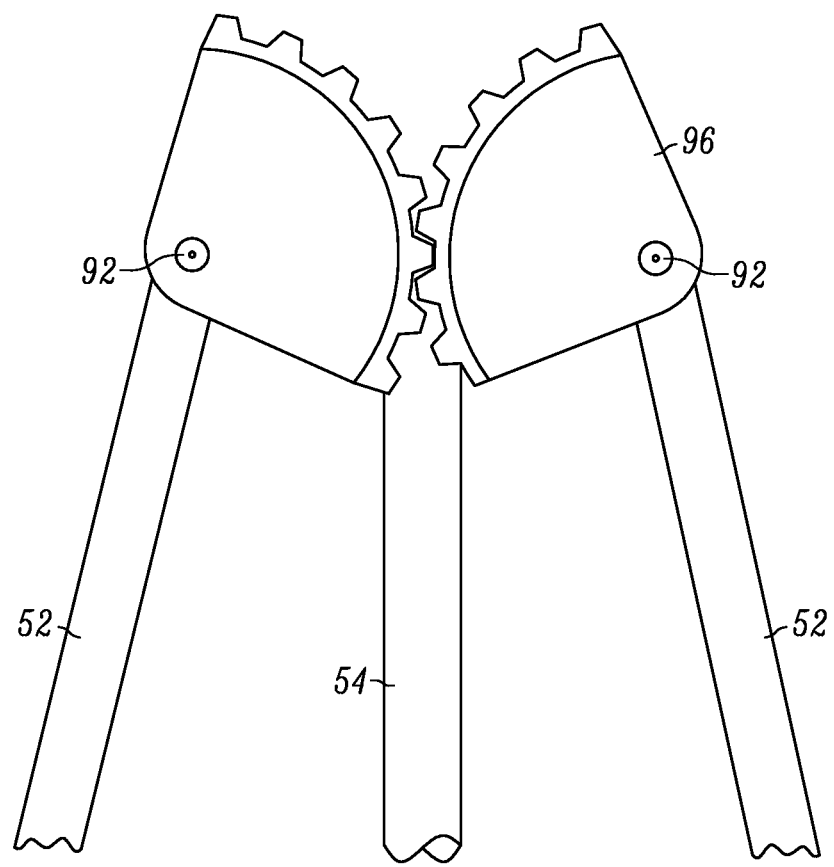
FIG. 6 is an enlarged view of another example of an articulating portion of the frame.

Referring to FIG. 6, in another example the longerons 52 of the first rim 50 may be coupled together via communicating rotatable gear sections 96 which enable synchronized deployment of the longerons 52. These gear sections 96 would therefore replace connecting members 90 along the first rim 50. The rotatable gear sections 96 along the first rim 50 may have the same construction as the gears 104, 106 on the second rim 70 or may have a different construction. As the frame 32 is deployed and thereby caused to expand, the interlocking gears 96 rotate to allow the first rim longerons 52 to lock into a fully deployed configuration at the same time, which minimizes stresses in the frame 32.

Figure 7:
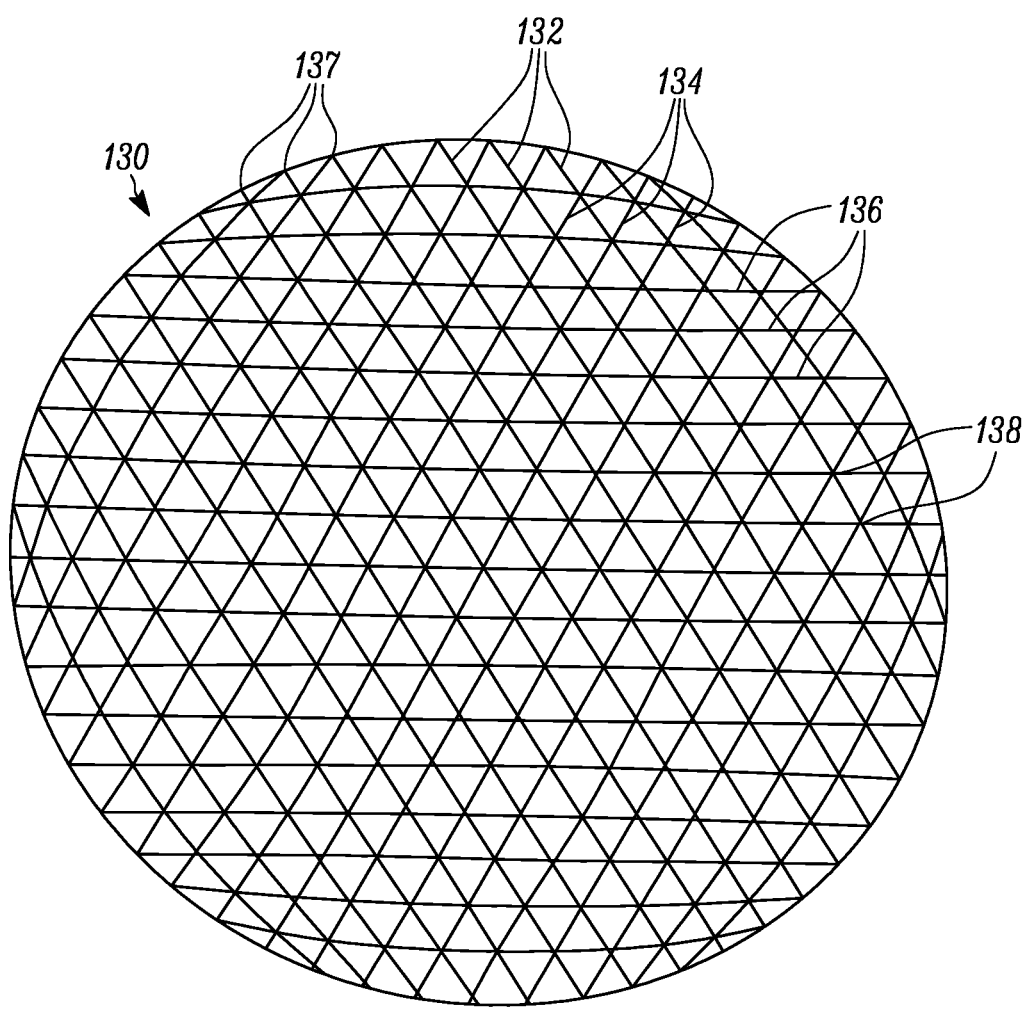
FIG. 7 is a schematic illustration of a first body of the reflector assembly of FIG. 1.

Referring to FIG. 7, the first body 130 constitutes a network or mesh net formed of a plurality of support members 132, 134, 136. The support members 132, 134, 136 act to support the reflective mesh 160 and constitute flexible, non-extensible bands or tapes that collectively form a circular or elliptical body. The support members 132, 134, 136 extend in three directions to form a mesh or net surface. The support members 132, 134, 136 cross over each other at points of intersection, or intersecting nodes 138 within the interior of the first body 130 to form a series of triangles nested in a desired shape, e.g., circular, hexagonal or elliptical. Intersection points of the support members 132, 134, 136 along the periphery of the first body 130 are indicated at 137.

The support members 132, 134, 136 cooperate with one another to define a series of concentric shapes each formed by a plurality of triangles. Generally, once the desired size of the first body 130 is determined based upon the operating frequency of the reflector assembly 30 the number and size of the triangles forming the first body is calculated to achieve the surface accuracy required for the desired operating frequency. Typically, the higher the operating frequency desired for the reflector assembly 30 the smaller the triangles and, thus, the more support members 132, 134, 136. FIG. 7 shows an example of a nine-ring configuration for an off-axis reflector, where the periphery of the first body 130 and the frame 32 (not shown) are configured to be elliptical to provide a circular aperture for the reflector assembly 30. Depending upon the particular application, the aperture size of the first body 130 may vary. Accordingly, the total number of triangular sections and, therefore, the number of inextensible support members 132, 134, 136 in the first body 130 also varies.

Figure 8:
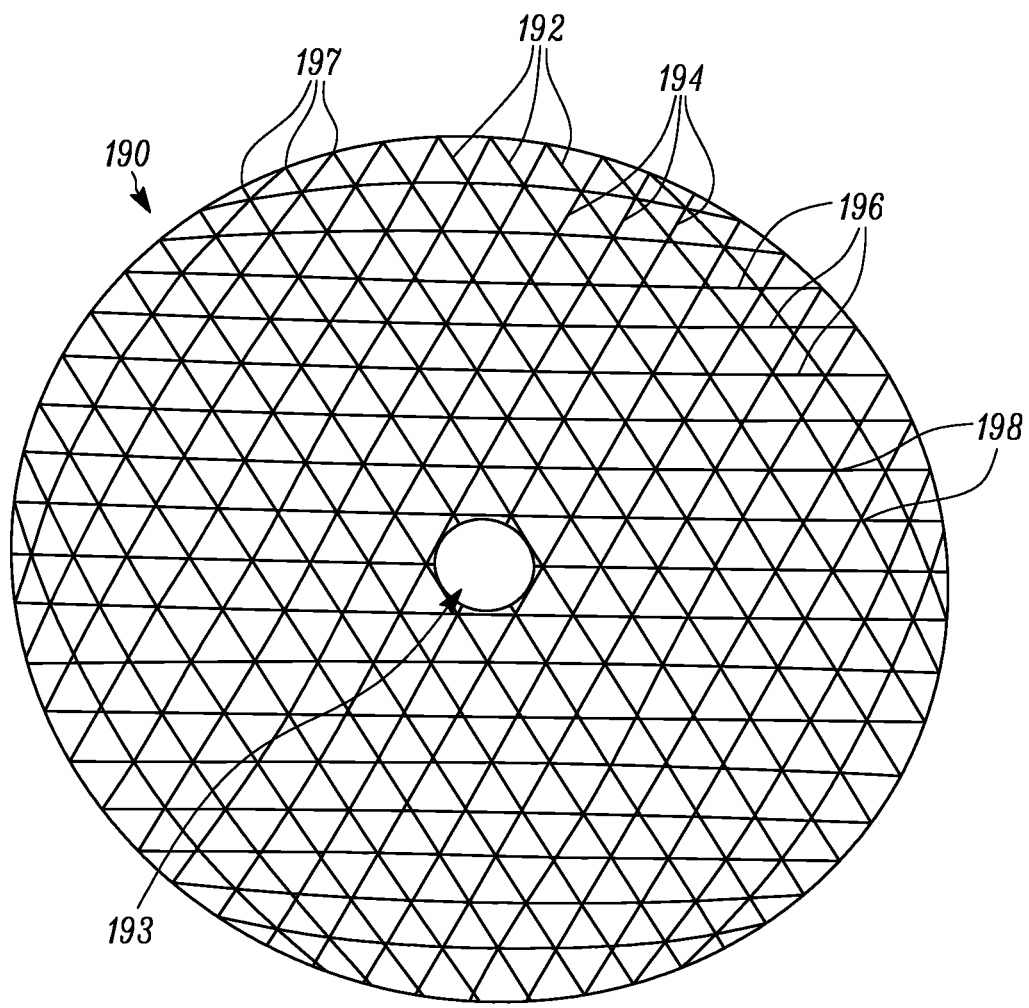
FIG. 8 is a schematic illustration of a second body of the reflector assembly of FIG. 1.

Referring to FIG. 8, the second body 190 is substantially identical in construction to the first body 130 and, thus, a thorough description of the second body is omitted for brevity. Accordingly, any reference features designated in the second body 190 are likewise present in the first body 130, e.g., support members 192, 194, 196, peripheral nodes 197, and intersecting nodes 198. The second body 190 is provided to support the first body 130 and maintain the first body in a curved, parabolic shape during deployment and operation of the reflector body 30, as will be described.

The second body 190 differs from the first body 130 only in that the second body is donut-shaped, i.e., includes an opening 193 at its center, and, in the example hereafter described, no reflective mesh 160 is secured to the second body. Due to the substantially identical shape and construction of the first and second bodies 130, 190, each intersection node 138 of the first body 130 has a corresponding intersection node 198 on the second body 190 aside from at the location of the opening 193 in the second body.

The support members 132, 134, 136 comprising the first and second bodies 130, 190 are made of a predominantly uniaxial fiber composite formed into strips having a rectangular cross-section. The material of each support member 132, 134, 136 should have a high bending strain limit, be flexible to accommodate deployment and collapsing of the reflector assembly 30, and may be selected to have a low coefficient of thermal expansion with a high extensional modulus to withstand many possible environmental changes.

It will be recognized that the support members may constitute other types of band structures implemented to produce the triangular ring formation in the first and second bodies 130, 190. The construction of the first body 130 and the second body 190 is driven by the need to develop an extremely lightweight, yet strong mesh reflector support frame while simultaneously being collapsible. Although the following discussion is directed to the specific construction of the first body 130 it will be appreciated that the second body 190 is similarly constructed to the first body. In other words, components and methodologies used to describe the first body 130 are likewise applicable to the second body 190 but are omitted for brevity. Therefore, other types of support member 132, 134, 136 configurations may be used to accommodate a variety of weight and size limitations. To this end, continuous support members 132, 134, 136 may be used to form the net surface of the first body 130 and the second body 190.

Referring to FIG. 9, continuous support members 132, 134, 136 for the first body 130 allow for precise and relatively easy positioning of the nodal intersections 138 of the first body 130 by simply shifting and adjusting the relative positions of the support members as desired. As described above, the support members 132, 134, 136 extend across the first body 130 in three criss-crossing directions to form a plurality of triangles arranged in a concentric pattern. The sets of continuous support members 132, 134, 136 may be laid over one another or the support members may be interwoven together to produce the desired triangular spacing and pattern in the first body 130 in a precise manner.

One or more of the support members 132, 134, 136 may include cooperating structure 142, 144 for tailoring the position of each intersecting node 138 to meet desired performance criterion for the reflector assembly 30. As shown in FIG. 10, precision stop elements 142 are disposed at intervals along the length of each support member 136, although it will be appreciated that stop elements are secured to every support member 132, 134, 136 in the first body 130. The stop elements 142 cooperate with positioning plates 144 to determine and set precise locations for the intersecting nodes 138. Referring to FIG. 11, the positioning plate 144 is a circular disk having machined grooves 146 provided about its perimeter and configured to receive the stop elements 142 on each support member 132, 134, 136 to reliably maintain the nodes 138 in the desired positions (FIG. 12). Accordingly, the diameter of the plates 144, location of the grooves 146, and/or the location of the stop elements 142 along the support members 132, 134, 136 can be adjusted to specifically configure the nodes 138 and mesh pattern of the first body 130 as desired. A series of anchor points 148 can be formed in each positioning plate 144 around the nodes 138 of the support members 132, 134, 136 for helping to connect the tensioning members 200 to the first and second bodies 130, 190, as will be discussed.

As shown in FIG. 13, the cooperating structure 136, 144 also helps to secure the reflective mesh 160 to the first body 130. The reflective mesh 160 is stretched and held taught while being placed against the underside of the first body 130 to eliminate wrinkles and creases. The stop elements 142 are then secured within the grooves 146 of the plates 144 via fasteners or the like to sandwich the support members 132, 134, 136 between the plates and reflective mesh 160. The stop elements 142 and plates 144 rigidly connect the reflective mesh 160 to the first body 130 to provide a surface to the first body that reflects electromagnetic signals (see also FIG. 2). Since the reflective mesh 160 is extensible and tightly stretched across the rear side of the first body 130 the reflective mesh assumes the shape of the first body, i.e., the mesh forms taut triangular facets indicating the outline of the intersecting support members 132, 134, 136. The reflective mesh 160 is lightweight, yet durable enough to form a smooth, flat surface when tension is applied to the first body 130. The reflective mesh 160 may be comprised of a sheet of knitted reflective mesh material. In one example, the reflective mesh 160 is a warp-knitted, gold-plated molybdenum wire.

Figure 14:
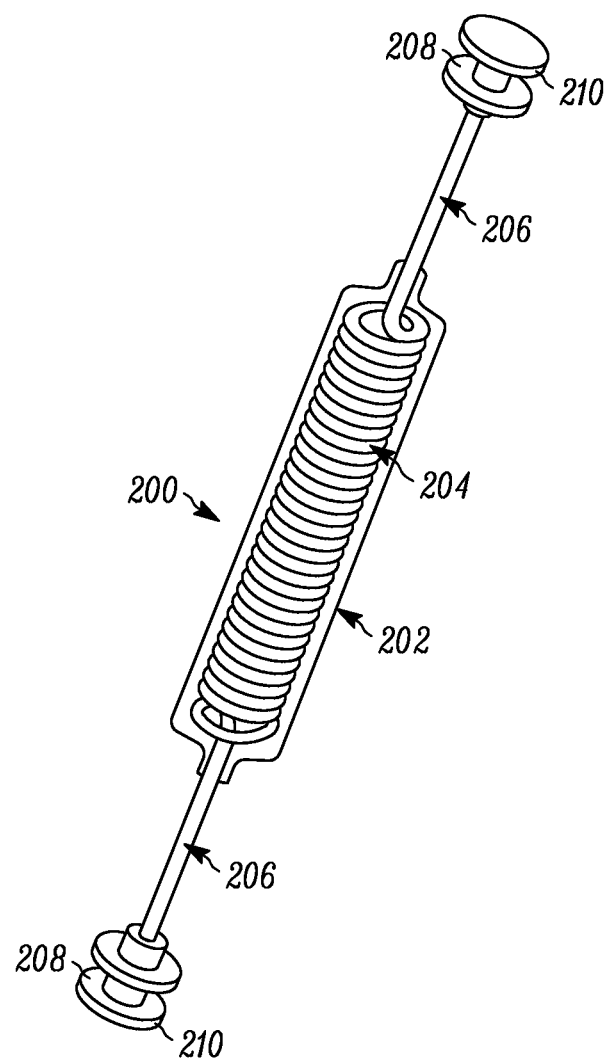
FIG. 14 is a schematic illustration of a tensioning member of the reflector assembly of FIG. 1.

Maintaining the reflective mesh 160 in a curved or parabolic shape is important to optimizing the RF reflection properties of the reflector assembly 30 and, thus, several features are provided to accomplish this objective, namely, the tensioning members 200 and support structure 220. As illustrated in FIGS. 2 and 14 the tensioning members 200 are fastened between the first and second bodies 130, 190 to pull the first and second bodies towards one another and thereby increase the rigidity of the bodies. In one example, the tensioning members 200 are connected to the anchor points 148 on the plates 144 on each body 130, 190 by guide wires 150 (see FIGS. 12 and 13). Since the first and second bodies 130, 190 are substantially identical to one another, each plate 144 of the first body 130 has a corresponding plate on the second body 190 and, thus, the tensioning members 200 extend between a plurality of the anchor points 148 generally vertically aligned with one another on each body. Although a few representative tensioning members 200 are illustrated in FIG. 2, it will be appreciated that fewer or more tensioning members may be present in the reflector assembly 30 to ensure adequate pulling forces between the bodies 130, 190.

Referring to FIG. 14, each tensioning member 200 includes a tube or sleeve 202 through which a tension spring 204 extends. The tension spring 204 has two straight, free ends 206 and is formed by a single length of wire. A spindle 208 is provided at each free end 206 and secures the tensioning member 200 to the first and second bodies 130, 190. Each spindle 208 is a two-piece member having a clip 210 which can be securely attached, e.g., clipped or screwed, to the remainder of spindle. More specifically, one end 206 of the tensioning member 200 is secured to the guide wire 150 extending through the plate 144 of the first body 130 and the other end 206 is connected to the guide wire extending through the plate on the second body 190. Depending on the curvature of the first and second bodies 130, 190 the tensioning members 200 may extend parallel to the axis 34 of the frame and/or may extend at angles relative to the axis.

In another example (not shown), the spindles 208 replace the positioning plates shown 144 in FIGS. 11-13. In this case, the flexible support members 132, 134, 136 of each body 130, 190 and the reflective mesh 190 are provided with a hole at each intersection node 138. With the clips 210 removed, a pin (not shown) on each spindle 208 or clip is inserted through corresponding holes in the support members 132, 134, 136 and reflective mesh 160 at the nodes 138 and the clips reconnected to the spindles to secure the tensioning members 200 to the first and second bodies 130, 190. In any case, once the spindles 208 are secured to the first and second bodies 130, 160, the tensioning members 200 pull the bodies towards one another and help supply and maintain rigidity in the first and second bodies.

Figure 15:
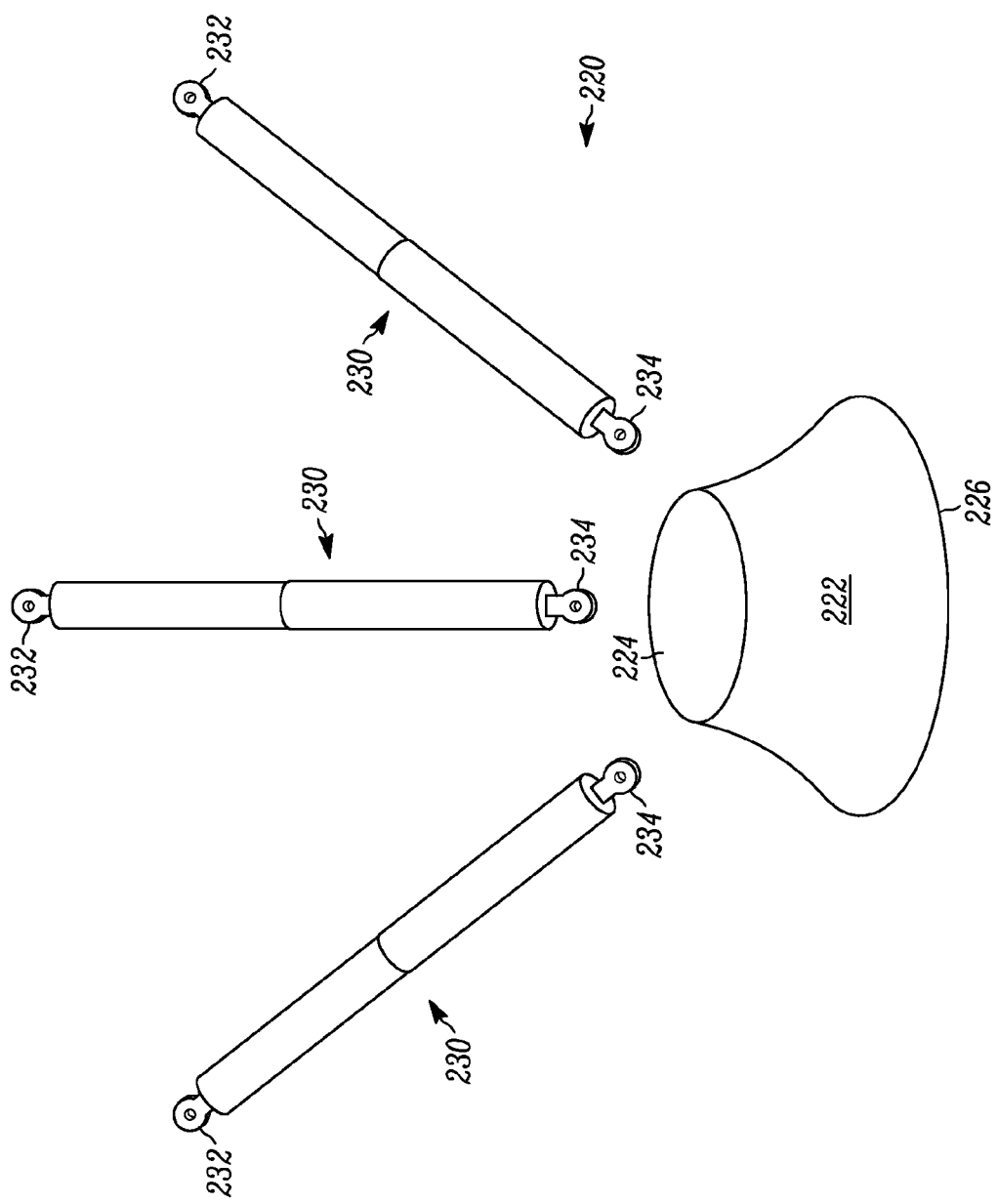
FIG. 15 is an exploded view of the support structure of the reflector assembly.

The support structure 220 illustrated in FIG. 15 helps to maintain a desired spatial relationship between the frame 32 and the bodies 130, 190, thereby defining the particular curved configuration(s) for the bodies. The support structure 220 includes a hub 222 and a plurality of telescoping (or foldable/collapsible) struts 230 connected to and extending from the hub. The hub 222 has a rigid, inextensible construction with a generally frustoconical shape defining a top surface 224 and a bottom surface 226. The perimeter of the hub 222 is substantially smaller than the perimeter of the frame 32. Each strut 230 includes an end 234 secured to the hub 222 and an end 232 secured to the frame 32 to place the hub partially or entirely outside, e.g., below, the interior of the frame. The ends 234, 232 of the struts 230 may have a hinged connection (not shown) with the frame 32 and the hub 222, respectively, to allow the struts to fold or telescope with the collapsing and deploying frame relative to the hub. The struts 230 are configured to hold the hub 222 in a desired position relative to the frame 32 and thereby maintain the first and second bodies 130, 190 in a desired position relative to the frame (see FIG. 2). In one example, at least a portion of the hub 222 has a position along the axis 34 that is spaced from the frame 32 to shape and maintain the first and second bodies 130, 190 in curved or parabolic configurations.

Referring to FIGS. 1 and 2, when the reflector assembly 30 is assembled, the peripheral points 137 of the first body 130 are secured to and along the first rim 50 of the frame 32. The peripheral points 197 of the second body 190 are secured to and along the second rim 70 of the frame 32. The top surface 224 of the hub 222 is secured to the underside of the first body 130 at its approximate center. The bottom surface 226 of the hub 222 is positioned within the opening 193 of the second body 190 and secured to the second body. The struts 230 are secured between and to the frame 32 and the hub 222 to position the hub along the axis 34 at least partially below the frame 32 such that the bodies 130, 190 secured to the hub the bodies each exhibit a curved or parabolic shape. As shown in FIG. 2, the first body 130 has a convex shape and the second body 190 has a substantially frustoconical shape. Consequently, the reflective mesh 160, which conforms to the shape of the first body 130, likewise has a convex shape.

The tensioning members 200 are secured to and between the first and second bodies 130, 190 in the manner described and tensioned sufficient to rigidly maintain the bodies and reflective mesh 190 in their curved shapes while secured to the hub 222. Since the first body 130 could extend entirely through the frame 32 the first body and, thus, the reflective mesh 160 secured thereto has a depth or height $H_2$ along the axis 34 that could be greater than the depth or height $H_1$ of the frame 32 along the axis.

In order to properly maintain the curved shapes of the bodies 130, 190, it is desirable to keep the tensioning force substantially normal to the surface of the reflective mesh 160. Tension applied to the bodies 130, 190 in this manner helps to ensure that the support members 132, 134, 136 do not curve, bend or move out of position relative to one another as a result of uneven forces between tensioning members 200. Accordingly, it is desirable for the tensioning members 200 to apply constant pulling forces between the bodies 130, 190 to help ensure that the bodies maintain the appropriate curved shapes throughout operation of the reflector assembly 30.

It is clear from FIGS. 1 and 2 that both the first and second bodies 130, 190 exhibit curved shapes when the frame 32 is fully deployed. The first and second curved bodies 130, 190 are stacked such that both bodies reside generally on the same side of the frame 32.

As noted, the struts 230 are secured between the hub 222 and the frame 32 to help maintain the first and second bodies 130, 190 and reflective mesh 160 in the desired curved shapes during deployment and operation of the reflector assembly 30. As shown in FIG. 1, at least three struts 230 extend radially outward from the hub 222 towards the frame 32 and are positioned equidistantly about the axis 34. Accordingly, the tensioning members 200 secure the first and second bodies 130, 190 together in their desired curved shapes attached to the hub 222 and the struts 230 hold the first and second bodies in place relative to the frame 32.

In operation, and referring back to FIGS. 4-5, to deploy the reflector assembly 30, tension is applied to the end of the cable 110 by the motor 112, which shortens the length of the cable between consecutive pulleys 94. This causes the longerons 52, 72 to pivot about their associated connecting members 90, 100 via the pins 92 and gears 104, 106 through the state shown in FIG. 5 to the fully deployed state shown in FIG. 4. Each set of gears 104, 106 rotates in unison with rotation of the pins 92 so that all longerons 52, 72 pivot or rotate together to effect a smooth deployment of the frame 32 and bodies 130, 160.

Figure 16:
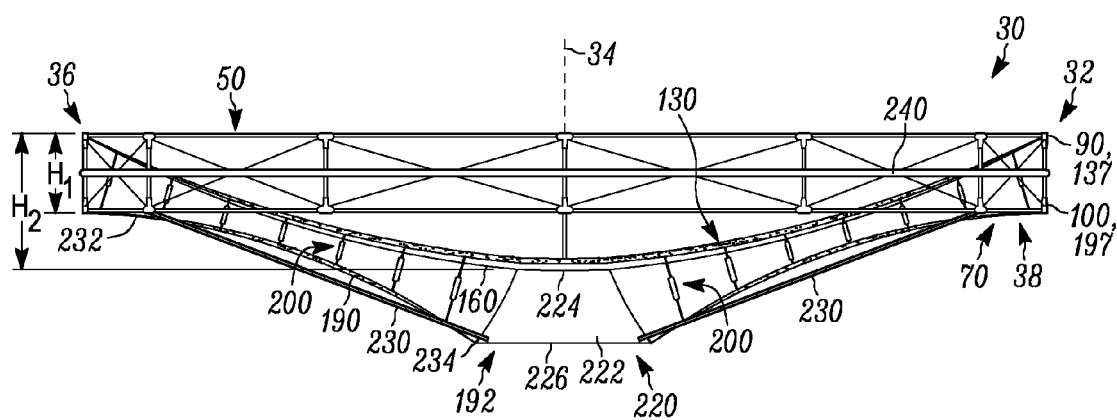
FIG. 16 is a side view of the reflector assembly of FIG. 2 secured to a deployment structure.
Figure 17A:
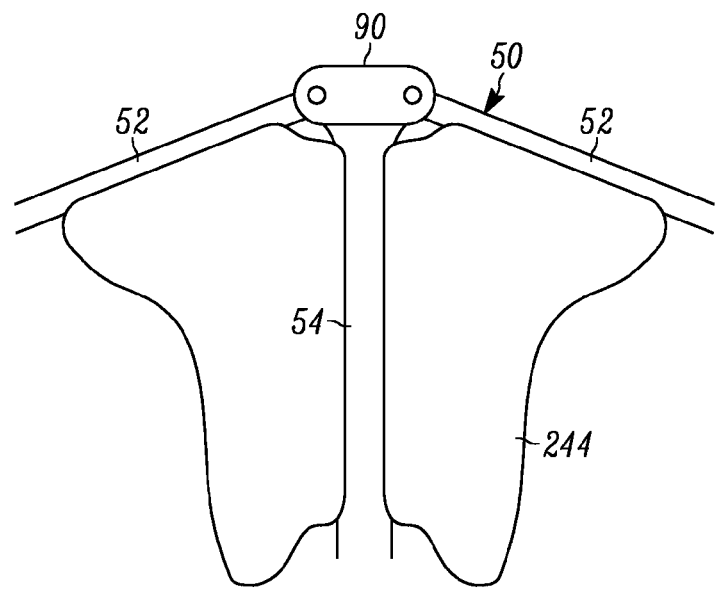
FIGS. 17A and 17B are enlarged portions of the rim of the reflector assembly secured to deployment devices.
Figure 17B:
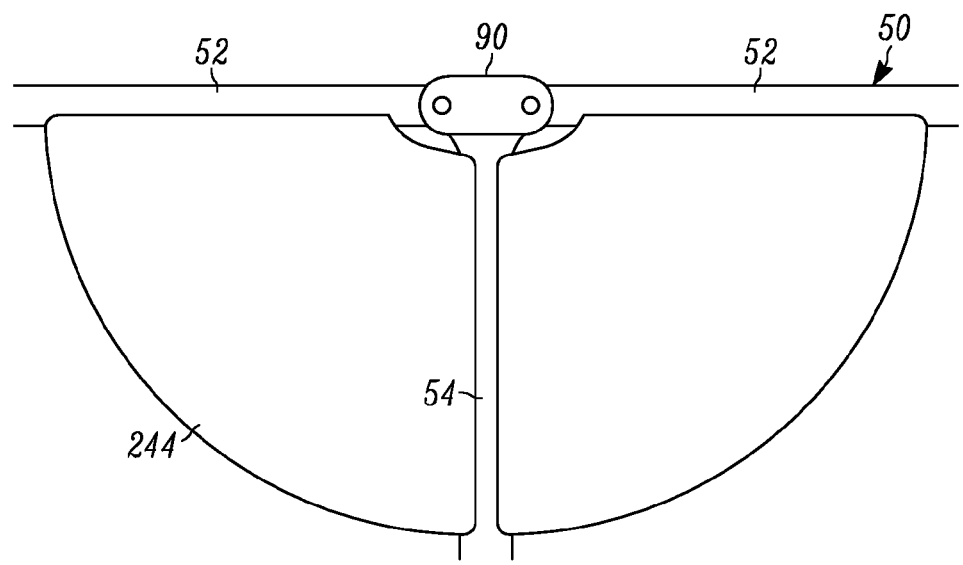

Alternatively, and referring to FIG. 16, the frame 32 may be deployed using a tubular inflatable device 240 or balloon coupled to the perimeter of the frame. Inflation or deflation of the device 240 causes the frame 32 to deploy or collapse, respectively. The frame 32 may therefore be deployed uniformly and synchronously upon inflation of the inflatable device 240. In another example shown in FIGS. 17A-B, a plurality of actuators 244 may be distributed around the frame 32 between each vertical strut 54 and the adjacent longeron 52 in the first rim 50 as well as between each vertical strut 54 and longeron 72 in the second rim 70 (not shown), which synchronizes deployment of the frame. Such distributed actuators 244 may comprise electrical drive motors, e.g., stepper motors, or a plurality of inflatable devices coupled between the vertical struts 54 and longerons 52, 72. Upon actuation of the motors 244 or inflation of inflatable devices, respectively, the frame 32 is deployed uniformly and synchronously. Deployment of the frame 32 causes the bodies 130, 190 and tensioning members 200 to tension and—in cooperation with the support structure 220—ultimately reach the steady-state positions shown in FIGS. 1-2.

Regardless of how the frame 32 is deployed, the pliable nature of the first and second bodies 130, 190 and reflective mesh 160, coupled with the hinged connection between the struts 230 and frame 32/hub 222, allows the bodies and reflective mesh to readily fold or collapse inwards (not shown) as the frame collapses. Collapsing the frame 32 necessarily causes the hub 222 to move further below or away from the frame due to connection of the struts 230 therebetween. Consequently, the first and second bodies 130, 190 secured to the hub 222 have deeper or more severe curved configurations—and smaller diameters/footprints when the frame 32 is collapsed, thereby shrinking the size of the collapsed reflector assembly 30 and facilitating storage.

Figure 18:
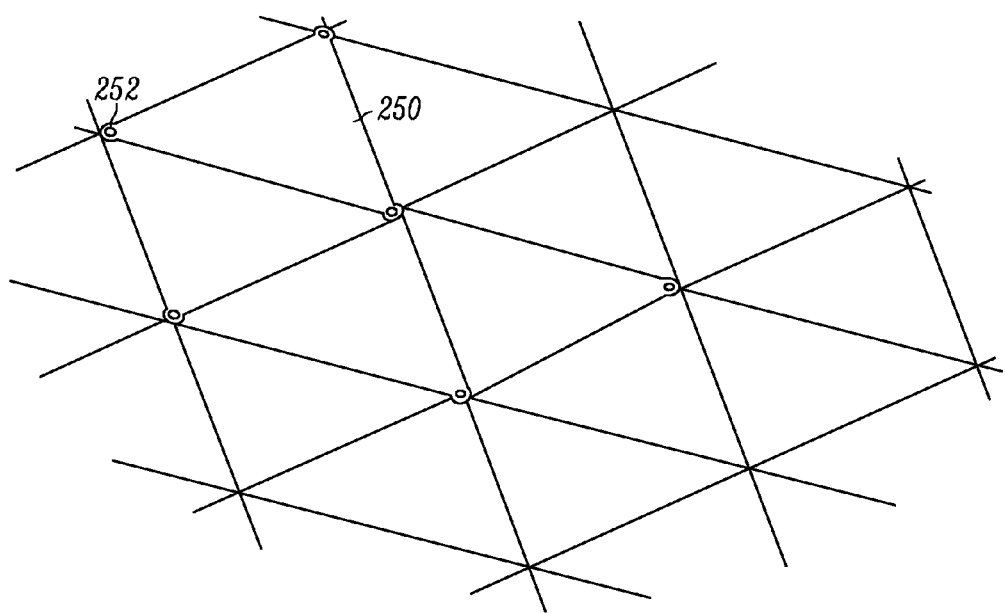
FIG. 18 is a schematic illustration of another example of a frame of the reflector assembly.

It lieu of a deployable frame 32, it may be desirable to construct the frame as a rigid, non-deployable structure with reduced weight compared to the deployable frame. In such a case, the frame 32, first body 130, and reflective mesh 160 may be transported and mounted on a spacecraft in a fully deployed state. The frame 32 may be constructed of cylindrical or square tubing bolted or otherwise rigidly affixed together and the reflective mesh 160 transported in an unfurled state. In this case, the reflector assembly 30 may be constituted by a membrane formed of a plurality of flat reflective polygonal, preferably triangular, facets 250 as shown in FIG. 18. It will be understood, however, that the reflector assembly 30 for use in the deployable frame 32 may likewise be formed from the reflective, polygonal facets 250 (not shown). Regardless, each facet 250 includes a sheet of a radar reflecting, electrically conductive metal, such as aluminum. The sheet has a thickness sufficient to withstand—without stretching or deformation—the tension forces required to hold the first and second bodies 130, 190 in the desired curved shapes. The reflective first body 130 will perform the functions of both the network of intersecting support members 123, 134, 136 and the reflective mesh 160 previously described herein.

In the example of FIG. 18, the corners of each facet 250 include a connecting point 252 to connect corresponding corners of adjacent facets. The tensioning members 200 previously discussed are connected to each point 252 and secure connect adjacent facets 250 together. The surface formed by facets 250 may be provided alone or may be associated with a network of the previously described support members 132, 134, 136. Regardless, the facets 250 may include a light reflecting finish or coating such that the reflector assembly 30 can be used as a solar radiation concentrator. Any known techniques for imparting a high level of light reflectivity to facets 250 may be employed.

Based on the construction of the reflector assembly 30 described herein, the reflective characteristics of the reflector assembly display a precise radiation response pattern and is particularly constructed to minimize structural errors and inconsistencies upon deployment in space. The curvature of the reflective mesh 160, which is formed by the first body 130 and support structure 220 and maintained by the tensioning members 200 and second body 190, precisely intercepts incoming RF or optical waves and reflects the waves to a common focal point. Since the first body 130 is located very close to the reflective mesh 160, incoming and outgoing electromagnetic signals are reflected off the reflective mesh without interference by the first body. As a result, the reflectivity of the reflector assembly 30 can be maximized.

The reflector assembly 30 is advantageous in that it is lightweight, compact, and maintains a precise curved or parabolic reflective surface that is held in place during deployment and operation. A significant consideration in the design and construction of the reflector assembly 30 is the need to minimize the weight of the frame 32. Furthermore, the frame 32 and bodies 130, 190 produce a very stiff parabolic antenna surface with the reflective mesh 160 that can withstand a variety of external disturbances to thereby maintain the parabolic shape. As the frame 32 and support structure 220 counteract vertical distortion and thereby support the bodies 130, 190, the bodies likewise counteract radial distortion. Therefore, any external forces which impinge upon the frame 32 and bodies 130, 190 cancel each other. Accordingly, the frame 32 provides sufficient stability and stiffness to resist and counter the forces applied by the tensioning members 200 to the support members 132, 134, 136 of the bodies 130, 190 to thereby maintain the reflector assembly 30 in a force-neutral condition.

As noted, the frame 32 and bodies 130, 190 are collapsible for later deployment in space. Because the reflector assembly 30 must be transported to or launched in space and mounted to a variety of spacecraft, the overall package size of the collapsed reflector assembly before deployment is important. Depending upon the particular configuration of the bodies 130, 190 and frame, the bodies and frame 32 may be packaged with the parabolic bodies attached as a single, deployable unit. The bodies 130, 190 and reflective mesh 160 are made of sufficiently flexible materials to be compressed within a collapsed frame 32. The bodies 32 and reflective mesh 130, 190, however, may also be folded or otherwise compacted, depending upon the particular materials used.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A reflector assembly comprising:
a frame centered about a longitudinal axis and extending a first distance along the axis the frame including a plurality of longerons and struts that are pivotable relative to one another such that the frame is moveable between a deployed condition and a collapsed condition;
a curved first body secured to the frame and extending a second distance along the longitudinal axis greater than the first distance; and
a reflective mesh having an electromagnetically reflective surface and being secured to the curved first body.

2. The reflector assembly of claim 1, wherein the curved first body is convex.

3. The reflector assembly of claim 1 further comprising:
a curved second body; and
at least one tensioning member connected to and extending between the curved first body and the curved second body for maintaining the shape of the curved first body.

4. The reflector assembly of claim 3, wherein at least one of the tensioning members extends at an angle relative to the longitudinal axis.

5. The reflector assembly of claim 3, wherein the at least one tensioning member includes a tension spring that pulls the curved first body and curved second body towards one another for maintaining the shape of the curved first body.

6. The reflector assembly of claim 3, wherein the curved second body has a substantially frustoconical shape.

7. The reflector assembly of claim 3, further comprising a support structure secured to the curved first body, the curved second body, and the frame for maintaining the position of the curved first body and curved second body relative to the frame.

8. The reflector assembly of claim 7, wherein the support structure includes a hub secured to the curved first body and the curved second body and a plurality of struts extending between the hub and the frame.

9. The reflector assembly of claim 8 wherein at least a portion of the hub has a position along the axis spaced axially from the frame for shaping the curved first body.

10. The reflector assembly of claim 3, wherein the support body extends away from the frame.

11. The reflector assembly of claim 1, wherein the curved first body includes a plurality of inextensible support members interconnected to form a net to which the reflective mesh is attached.

12. A reflector assembly comprising:
a frame extending about a longitudinal axis;
a curved first body secured to the frame;
a reflective mesh having an electromagnetically reflective surface and being secured to the curved first body;
a hub secured to the curved first body and including at least a portion having a position along the axis spaced axially from the frame for shaping the curved first body; and
a plurality of struts extending between the hub and the frame for maintaining the position of the hub relative to the frame.

13. The reflector assembly of claim 12, wherein the curved first body is convex.

14. The reflector assembly of claim 12 further comprising:
a curved second body; and
at least one tensioning member connected to and extending between the curved first body and the curved second body for maintaining the shape of the curved first body.

15. The reflector assembly of claim 14, wherein at least one of the tensioning members extends at an angle relative to the longitudinal axis.

16. The reflector assembly of claim 14, wherein the curved second body has a substantially frustoconical shape.

17. The reflector assembly of claim 12, wherein the frame includes a plurality of longerons and struts that are pivotable relative to one another such that the frame is moveable between a deployed condition and a collapsed condition.

18. The reflector assembly of claim 12, wherein the curved first body includes a plurality of inextensible support members interconnected to form a mesh net to which the reflective mesh is attached.

19. A reflector assembly comprising:
a frame centered about a longitudinal axis and extending a first distance along the axis, the frame including a plurality of longerons pivotable relative to one another and a plurality of struts pivotable relative to one another such that the frame is moveable between a deployed condition and a collapsed condition;
a curved first body secured to the frame and extending a second distance along the longitudinal axis greater than the first distance, the curved first body including a plurality of inextensible support members that define a mesh surface;
a flexible, reflective mesh having an electromagnetically reflective surface and being secured to the mesh surface of the curved first body;
a curved second body connected to the curved first body by a plurality of tensioning members for maintaining the shape of the curved first body; and
a support structure secured to the frame and the first and second curved bodies shapes the first and second curved bodies.

20. The reflector assembly of claim 19, wherein the curved first body intersects the longitudinal axis at a location spaced axially from the frame along the axis.

21. The reflector assembly of claim 1, wherein the curved first body intersects the longitudinal axis at a location spaced axially from the frame along the axis.

22. The reflector assembly of claim 12, wherein the curved first body intersects the longitudinal axis at a location spaced axially from the frame along the axis.

23. The reflector assembly of claim 20, wherein the curved second body includes a central opening for receiving the support structure and intersecting the longitudinal axis at a location spaced axially from the frame along the axis.

24. The reflector assembly of claim 3, wherein the curved first body intersects the longitudinal axis at a location spaced axially from the frame along the axis and the curved second body includes a central opening intersecting the longitudinal axis at a location spaced axially from the frame along the axis.

25. The reflector assembly of claim 14, wherein the curved first body intersects the longitudinal axis at a location spaced axially from the frame along the axis and the curved second body includes a central opening for receiving the hub and intersecting the longitudinal axis at a location spaced axially from the frame along the axis.

* * * * *